US012385304B2

(12) United States Patent
Sytnyk et al.

(10) Patent No.: US 12,385,304 B2
(45) Date of Patent: Aug. 12, 2025

(54) ROTATABLE SUSPENSION RAIL BACKGROUND SYSTEM WITH MULTIPLE PANELS

(71) Applicants: Yuliya Sytnyk, North Vancouver (CA); Maryna Frolova, North Vancouver (CA)

(72) Inventors: Yuliya Sytnyk, North Vancouver (CA); Maryna Frolova, North Vancouver (CA)

( * ) Notice: Subject to any disclaimer, the term of this patent is extended or adjusted under 35 U.S.C. 154(b) by 343 days.

(21) Appl. No.: 17/737,891

(22) Filed: May 5, 2022

(65) Prior Publication Data

US 2023/0050471 A1 Feb. 16, 2023

Related U.S. Application Data

(60) Provisional application No. 63/231,671, filed on Aug. 10, 2021.

(51) Int. Cl.
*E05D 15/06* (2006.01)
*E04B 2/82* (2006.01)

(52) U.S. Cl.
CPC ............ *E05D 15/063* (2013.01); *E04B 2/827* (2013.01)

(58) Field of Classification Search
CPC ... E05D 15/063; E05D 15/26; E05D 15/0652; E05D 15/0604; E04B 2/827; E05Y 2201/64; E05Y 2201/684; E05Y 2900/142; A63J 1/02; A63J 1/028; G03B 15/10; G03B 15/06; E06B 9/0638
See application file for complete search history.

(56) References Cited

U.S. PATENT DOCUMENTS 145,487 A * 12/1873 Buchtel .................. G03B 15/06 396/3
281,532 A * 7/1883 Lindop ................. E06B 9/0638 396/3
373,794 A * 11/1887 Armbruster ............... E06B 9/52 396/3

(Continued)

FOREIGN PATENT DOCUMENTS

JP 2000310083 A * 11/2000

OTHER PUBLICATIONS

Mobile Partition, Retrieved from Internet, Retrieved on Oct. 27, 2020 <URL: https://www.archiexpo.com/>.

*Primary Examiner* — Rodney Mintz

(57) ABSTRACT

A rotatable suspension rail background system with multiple panels is an apparatus that maximizes the amount of background options in a studio area in an indoor or outdoor area for a photoshoot or video shoot. The apparatus includes track system and at least one background assembly. The track system defines a path for each of the plurality of background assemblies and guides each of the at least one background assembly across the studio area. The track system includes an upper main rail, an upper supplementary rail, and an upper raceway. The at least one background assembly provides various visual backgrounds for a photograph or video. More specifically, the apparatus further includes a first background sheet fixed across a first panel face of a support panel of the at least one background assembly. The apparatus further includes a second background sheet fixed across a second panel face of the support panel.

15 Claims, 10 Drawing Sheets

(56) References Cited

U.S. PATENT DOCUMENTS

| | | | | | |
|---|---|---|---|---|---|
| 3,084,933 | A * | 4/1963 | Alswang | A63J 21/00 472/61 |
| 4,274,467 | A * | 6/1981 | Comeau | E06B 9/0638 160/183 |
| 6,547,670 | B1 | 4/2003 | Kempf | |
| 8,033,068 | B2 | 10/2011 | Lüttmann | |
| 8,365,796 | B2 | 2/2013 | Coleman | |
| 8,875,457 | B2 * | 11/2014 | Geller | G03B 15/06 362/357 |
| 9,309,669 | B2 | 4/2016 | Ariza | |
| 9,477,142 | B1 * | 10/2016 | Baumgartner | A63J 1/02 |
| 10,171,734 | B2 * | 1/2019 | Mueller | F16M 11/048 |
| 10,268,106 | B2 * | 4/2019 | Sytnyk | G03B 15/10 |
| 2007/0130853 | A1 * | 6/2007 | Kennedy | E04B 2/74 52/238.1 |
| 2008/0190043 | A1 * | 8/2008 | Beckmann | E04B 2/74 52/64 |
| 2009/0113799 | A1 * | 5/2009 | Luttmann | E04B 2/827 52/64 |
| 2011/0247275 | A1 * | 10/2011 | Coleman | E05F 15/605 49/358 |
| 2012/0170278 | A1 * | 7/2012 | Geller | G03B 15/06 362/320 |
| 2014/0137495 | A1 * | 5/2014 | Ariza | E04B 2/828 52/238.1 |
| 2014/0268627 | A1 * | 9/2014 | Contreras, Jr. | F21V 21/005 362/11 |
| 2015/0345131 | A9 * | 12/2015 | Ariza | E04B 2/00 52/238.1 |
| 2016/0353022 | A1 * | 12/2016 | Mueller | F16M 11/046 |
| 2018/0217476 | A1 * | 8/2018 | Sytnyk | G03B 15/10 |

* cited by examiner

ROTATABLE SUSPENSION RAIL BACKGROUND SYSTEM WITH MULTIPLE PANELS

The current application claims a priority to the U.S. Provisional Patent application Ser. No. 63/231,671 filed on Aug. 10, 2021.

FIELD OF THE INVENTION

The present invention generally relates to photography equipment. More specifically, the present invention is a rotatable suspension rail background system with multiple panels.

BACKGROUND OF THE INVENTION

Studios for a photoshoot or video shoot typically require plenty of equipment and accessories to achieve a desired look. In order to accommodate multiple clients and complete multiple projects, even more equipment and accessories are necessary as well as the time needed to adjust the studio in between shoots. During transition between shoots or takes between shoots, the chances of an accident or damage of the studio increases greatly.

It is therefore an objective of the present invention to increase the speed and ease of the installation and dismantling for a current setup of a studio. Moreover, the present invention may be permanently integrated into a studio while allowing multiple backgrounds to be interchanged. The present invention may also be portable and assembled in another studio area which may be indoors or outdoors.

DETAILED DESCRIPTIONS OF THE INVENTION

Figure 1:
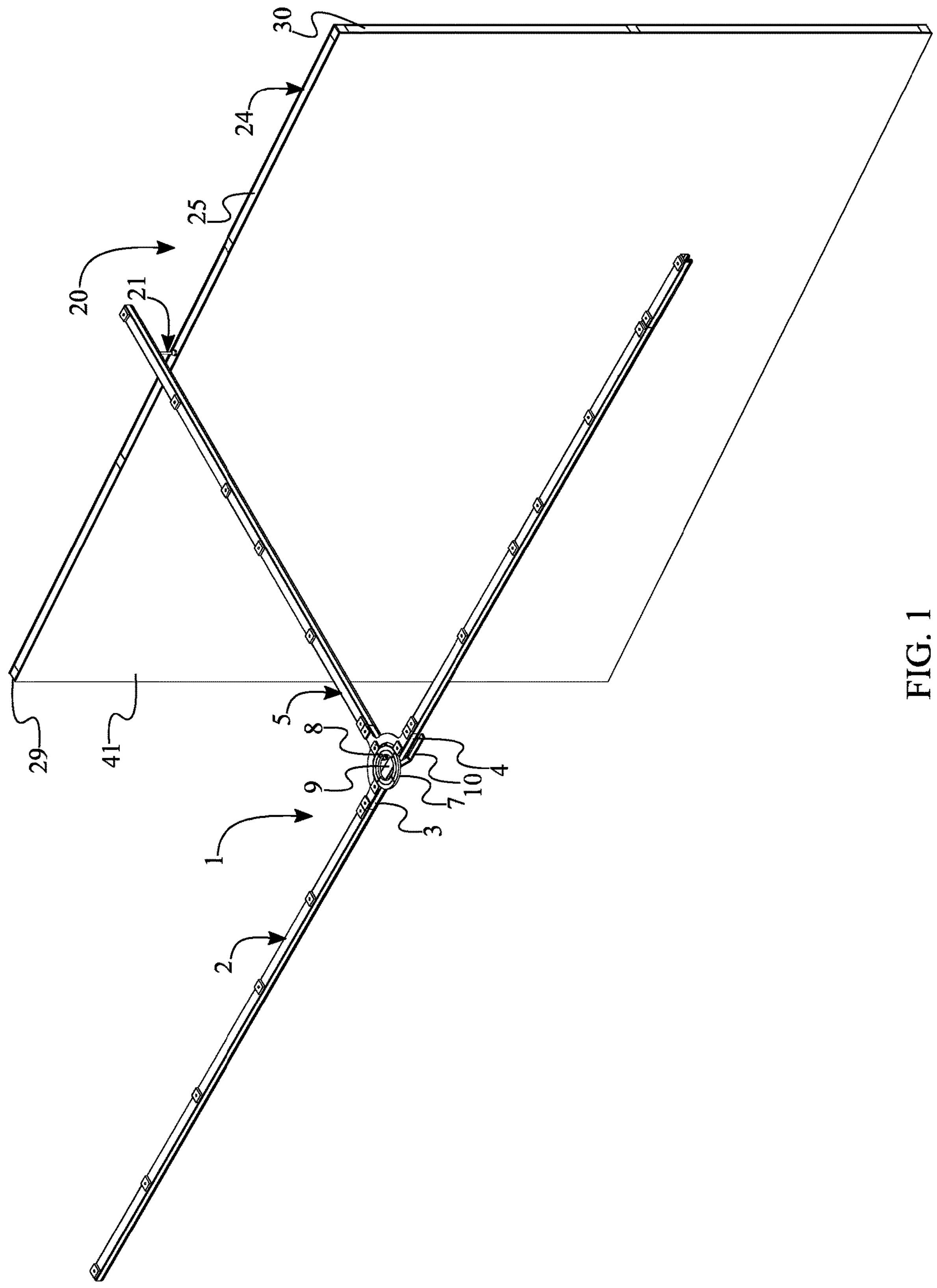
FIG. 1 is a front-top perspective view of a preferred embodiment of the present invention.

All illustrations of the drawings are for the purpose of describing selected versions of the present invention and are not intended to limit the scope of the present invention.

The present invention is a rotatable suspension rail background system with multiple panels. The present invention is a compact and modular system that can be installed into an existing studio or transported to various destinations and readily assembled. The present invention facilitates the interchanging of backgrounds during a photoshoot or video shoot. More specifically, the present invention provides the convenience and versatility that enhances the overall experience of the photoshoot or video shoot for the photographer or videographers, the technicians, and the models or cast. In order for the present invention to provide multiple backgrounds that are quickly and securely interchanged, the present invention comprises a track system 1 and at least one background assembly 20, seen in FIG. 1, FIG. 2, FIG. 4, FIG. 7, and FIG. 8. The track system 1 defines a path for the at least one background assembly 20 to slide across a designated studio area. The studio area may be a room or area indoors or an area outdoors. Furthermore, the track system 1 may be supported by the walls of a room or a portable, modular frame that may be assembled indoors or outdoors. In order for the track system 1 to guide the at least one background assembly 20, the track system 1 comprises an upper main rail 2, an upper supplementary rail 5, and an upper raceway 6. The upper main rail 2 and the upper supplementary rail 5, together, define the path for the at least one background assembly 20 into and out of the focus of a camera. More specifically, the upper main rail 2 is meant for storage or transportation, whereas the supplementary rail is preferably utilized as the chosen background for the photo or video. It is understood that the at least one background assembly 20 may be positioned along either the upper main rail 2 or the upper supplementary rail 5 as needed. The upper raceway 6 serves as a track along the upper main rail 2 and the upper supplementary rail 5. The at least one background assembly 20 provides a variety of background options for a photo or video that are not currently nor readily available in the studio area. The at least one background assembly 20 each comprises an upper roller guide 21 and a support panel 24. The upper roller guide 21 connects and glides the support panel 24 along the upper raceway 6. The upper roller guide 21 comprises an upper fixed guide end 22 and an upper free guide end 23. The upper fixed guide end 22 attaches the upper roller guide 21 with the track system 1. The upper free guide end 23 attaches the upper roller guide 21 with the support panel 24. The support panel 24 provides specific visual backgrounds that defines an environment for a photo or video. The support panel 24 comprises an upper panel edge 25 and a lower panel edge 26. The upper panel edge 25 is oriented towards the upper raceway 6, and the lower panel edge 26 is oriented towards the ground. In alternate embodiments of the present invention, the at least one background assembly 20 may further comprise at least one structural piece that provides additional texture for the support panel 24. More specifically, the at least one structural piece is a three-dimensional fixture that enhances the support panel 24 and consequently the background of the photo or video. In further alternate embodiments of the present invention, the at least one background assembly 20 may further comprise at least one aesthetic hole that serves as a walkway, a door entrance, or a window.

The overall configuration of the aforementioned components provides convenience and versatility while maintaining reliability for a studio area. In order to position a support panel 24 in a specific position within the studio area, the upper supplementary rail 5 is laterally connected with the upper main rail 2, seen in FIG. 1, FIG. 2, FIG. 7, and FIG. 8. In the preferred embodiment of the present invention, the upper supplementary rail 5 is positioned perpendicular with the upper main rail 2. However, it is understood that in various embodiments of the present invention, the upper supplementary rail 5 may be positioned at various angles with the upper main rail 2. The at least one background assembly 20 remains connected with the track system 1 while traversing along the track system 1 as the upper raceway 6 is integrated into and along the upper main rail 2 and the upper supplementary rail 5. The support panel 24 is offset from the upper main rail 2 and the upper supplementary rail 5, thereby preserving the structural integrity of the support panel 24 as the upper fixed guide end 22 is positioned opposite the upper free guide end about the upper roller guide 21. Moreover, the upper fixed guide end 22 is movably engaged along the upper raceway 6. A height for the support panel 24 is defined as the upper panel edge 25 is positioned opposite the lower panel edge 26 across the support panel 24. The height of the support panel 24 preferably encompasses the entire background of a photo or video. In order to further enhance the versatility of the present invention, the upper panel edge 25 is rotatably and removably attached with the upper free guide end 23. This allows each support panel 24 to be removed from and attached with a corresponding track system 1 while being able to be rotated while attached with the track system 1.

In order to maximize the options for a background of a photoshoot or video shoot, the at least one background assembly 20 may each further comprise a first background sheet 41 and a second background sheet 42, seen in FIG. 1, FIG. 2, FIG. 3, FIG. 4, FIG. 5, FIG. 6, FIG. 7, FIG. 8, FIG. 9, and FIG. 10. Moreover, the support panel 24 may comprise a first panel face 27 and a second panel face 28. The first background sheet 41 features a distinct visual background, and the second background sheet 42 features another distinct visual background. The first panel face 27 and the second panel face 28 are the opposing elongated areas that uphold the first background sheet 41 and the second background sheet 42, respectively. A thickness of the support panel 24 is defined as the first panel face 27 is positioned opposite the second panel face 28 about the support panel 24. More specifically, the first panel face 27 and the second panel face 28 are positioned in between the upper panel edge 25 and the lower panel edge 26. The support panel 24 provides two options for a background as the first background sheet 41 is fixed across the first panel face 27. Likewise, the second background sheet 42 is fixed across the second panel face 28.

Figure 9:
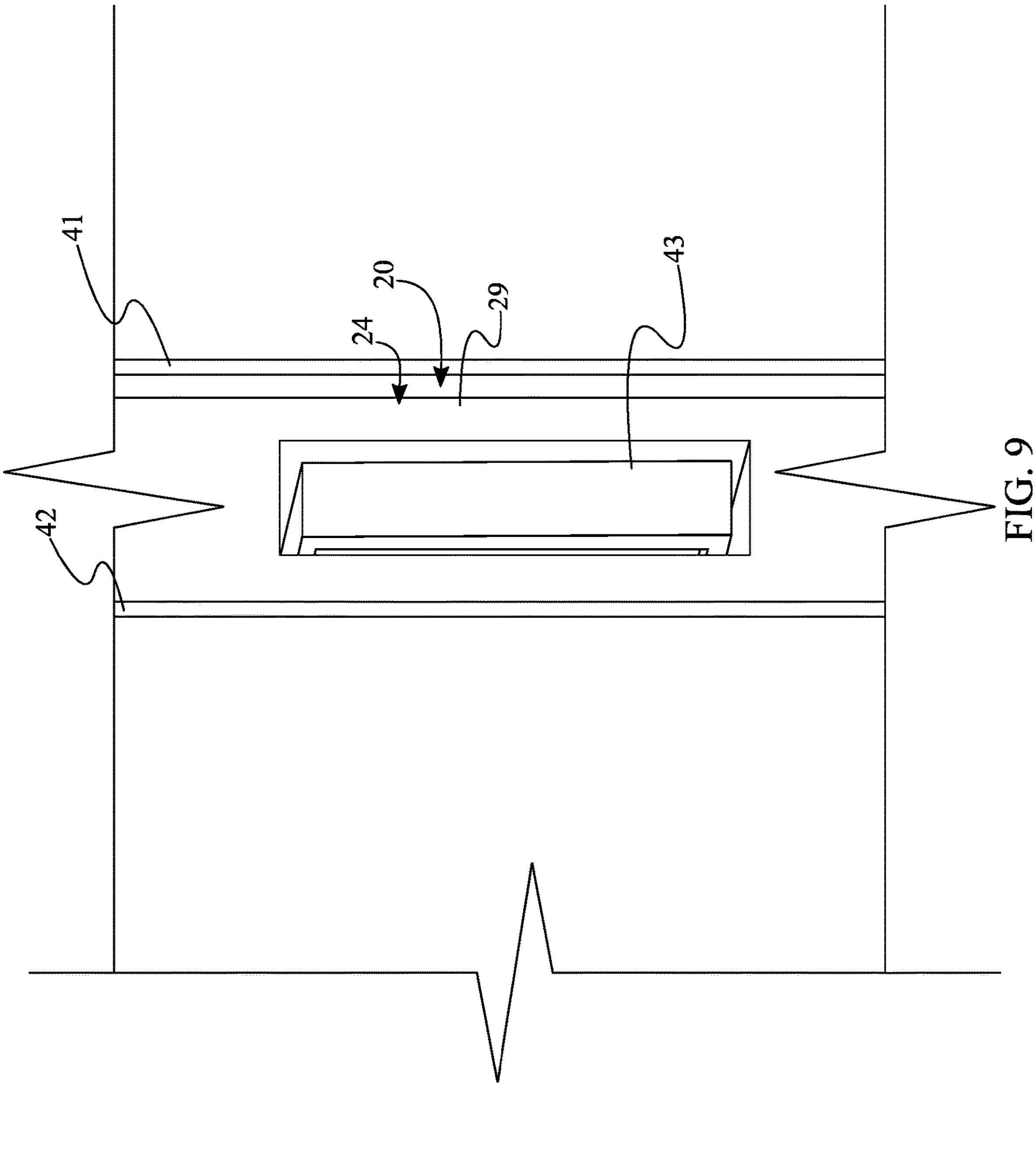
FIG. 9 is a perspective view of the present invention with a first retractable handle.
Figure 10:
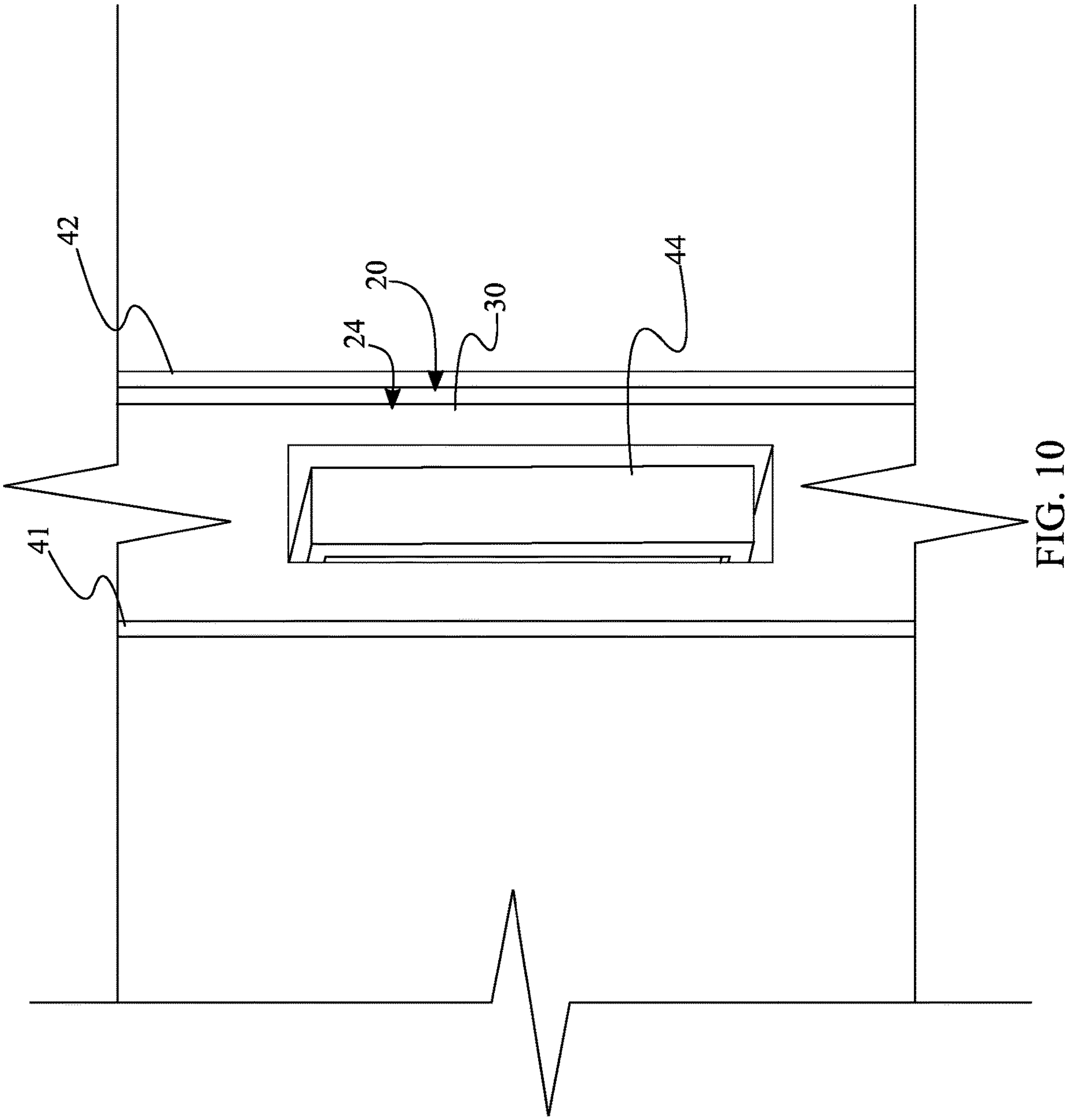
FIG. 10 is a perspective view of the present invention with a second retractable handle.

In order for a user to easily maneuver the support panel 24 along the track system 1, the at least one background assembly 20 may each further comprise a first retractable handle 43 and a second retractable handle 44, seen in FIG. 9 and FIG. 10. Furthermore, the support panel 24 may comprise a first lateral edge 29 and a second lateral edge 30. The first retractable handle 43 provides a maneuverable grip for the user along a side of the support panel 24. Conversely, the second retractable handle 44 provides a maneuverable grip for the user along the opposite side of the support panel 24. Moreover, the first retractable handle 43 and the second retractable handle 44 preserves the integrity of the support panel 24, and consequently the first background sheet 41 and the second background sheet 42, respectively, as the user may maneuver the support panel 24 without directly touching the first background sheet 41 and the second background sheet 42. The first retractable handle 43 and the second retractable handle 44 may also remain concealed during the actual capturing of a photo or a video. The first lateral edge 29 and the second lateral edge 30 are the sides of the support panel 24 that correspond to the thickness of the support panel 24. More specifically, the first lateral edge 29 is positioned opposite the second lateral edge 30 across the support panel 24. Furthermore, the first lateral edge 29 and the second lateral edge 30 are positioned in between the upper panel edge 25 and the lower panel edge 26. The first retractable handle 43 is easily accessible as the first retractable handle 43 is fixed in adjacent with the first lateral edge 29. Likewise, the second retractable handle 44 is easily accessible from the opposite side as the second retractable handle 44 is fixed adjacent the second lateral edge 30. It is understood that the first retractable handle 43 and the second retractable handle 44 comprise the necessary mechanisms that are integrated into the first lateral edge 29 and the second lateral edge 30, respectively, that allows the first retractable handle 43 and the second retractable handle 44 to be readily extended from within the support panel 24 and retracted back into the support panel 24.

Figure 2:
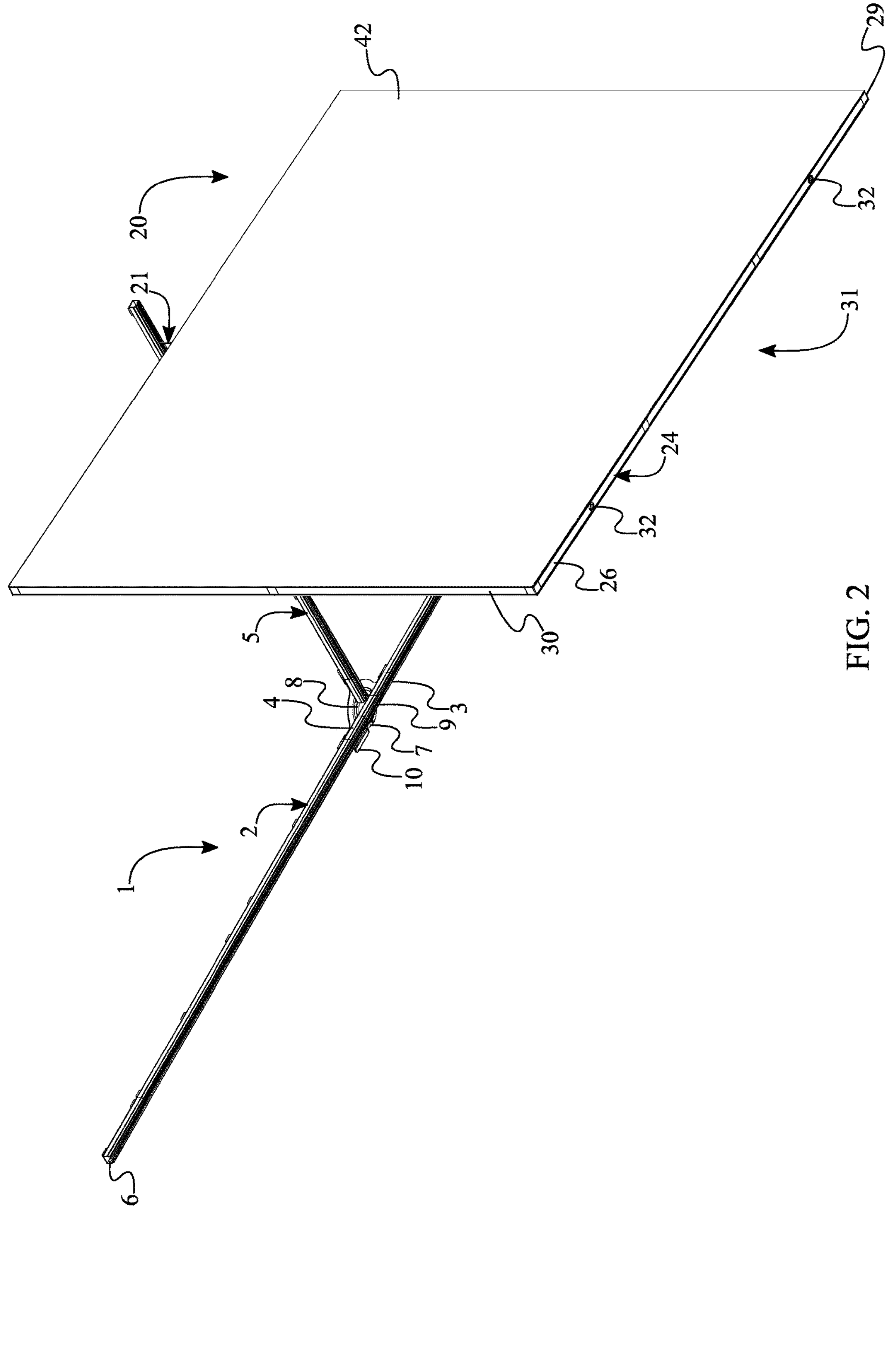
FIG. 2 is a rear-bottom perspective view of the preferred embodiment of the present invention with a plurality of rollerballs for a wheel system.
Figure 3:
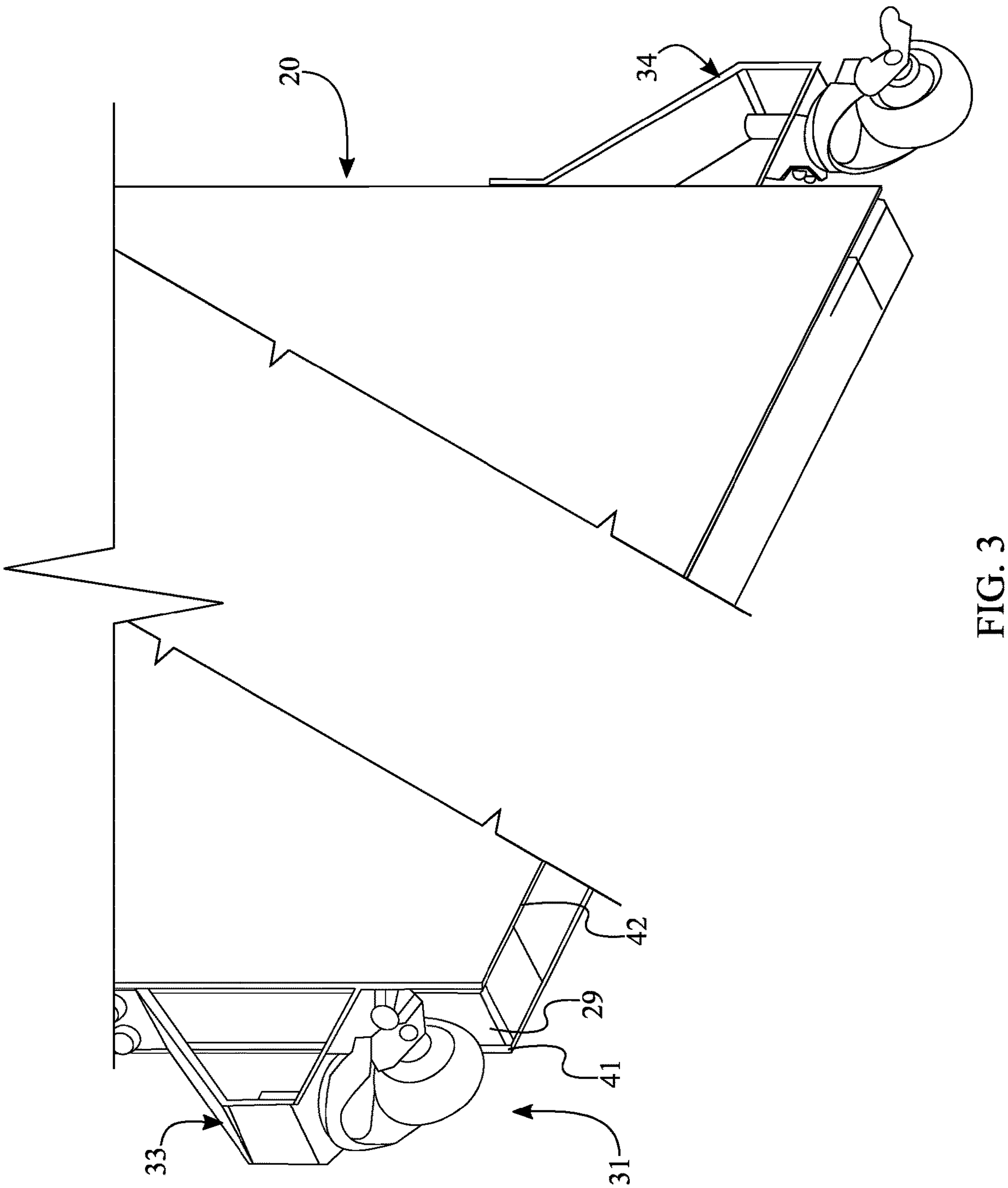
FIG. 3 is a front-bottom perspective view of the present invention with a first castor wheel and a second castor wheel for the wheel system.
Figure 4:
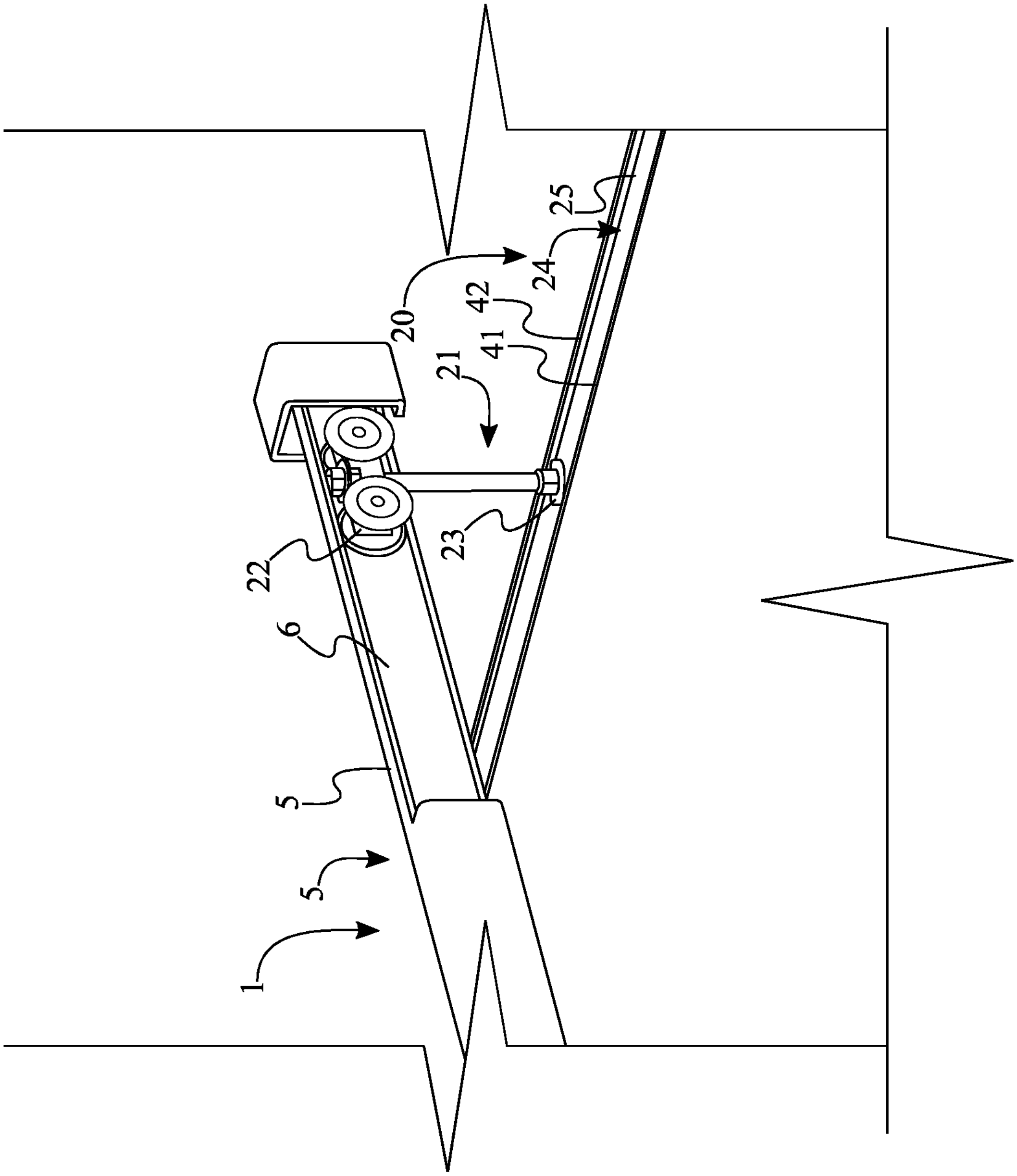
FIG. 4 is a front-top perspective magnified view of an upper roller guide of the present invention.
Figure 5:
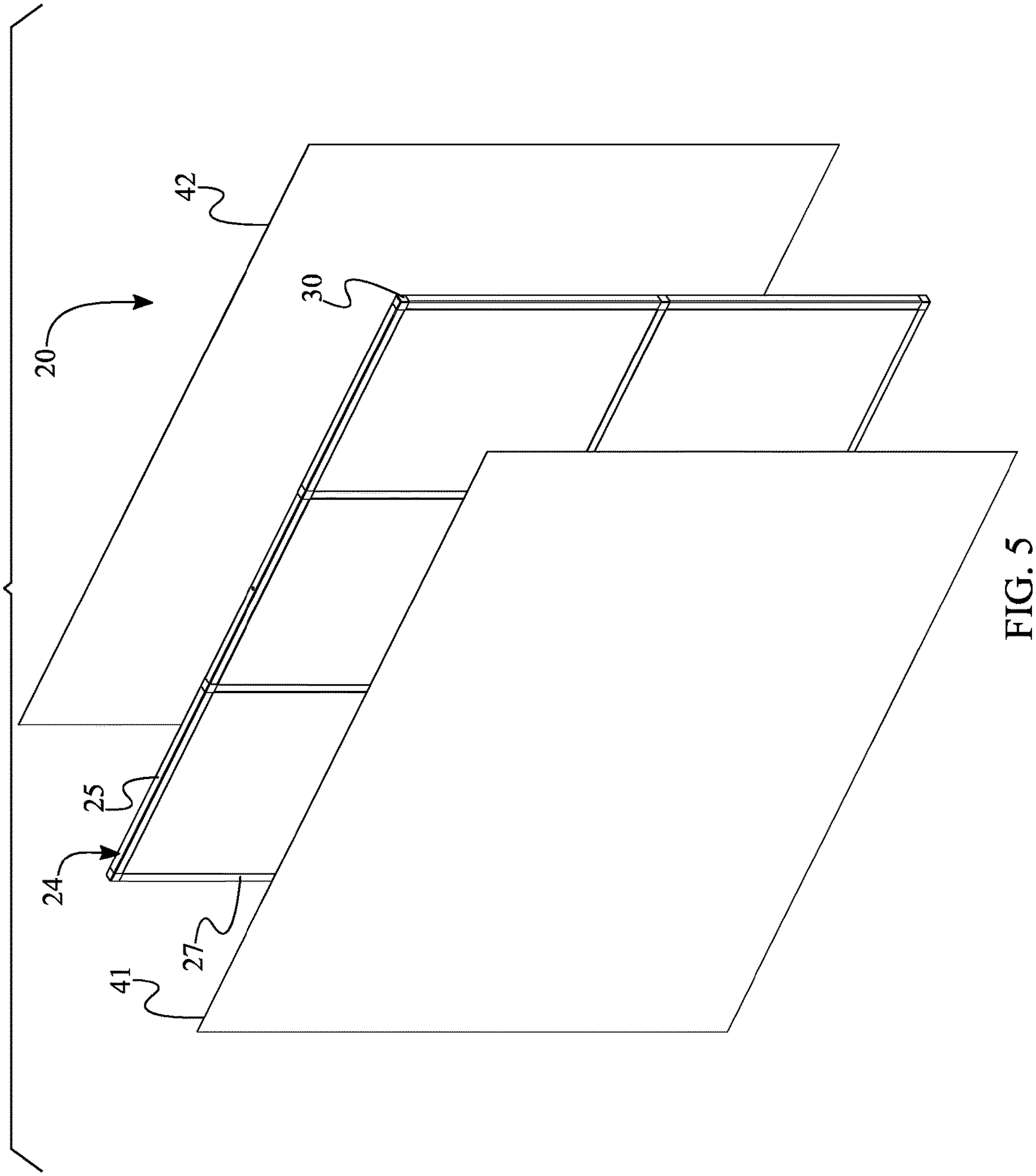
FIG. 5 is a front-top exploded view of at least one background assembly of the present invention.
Figure 6:
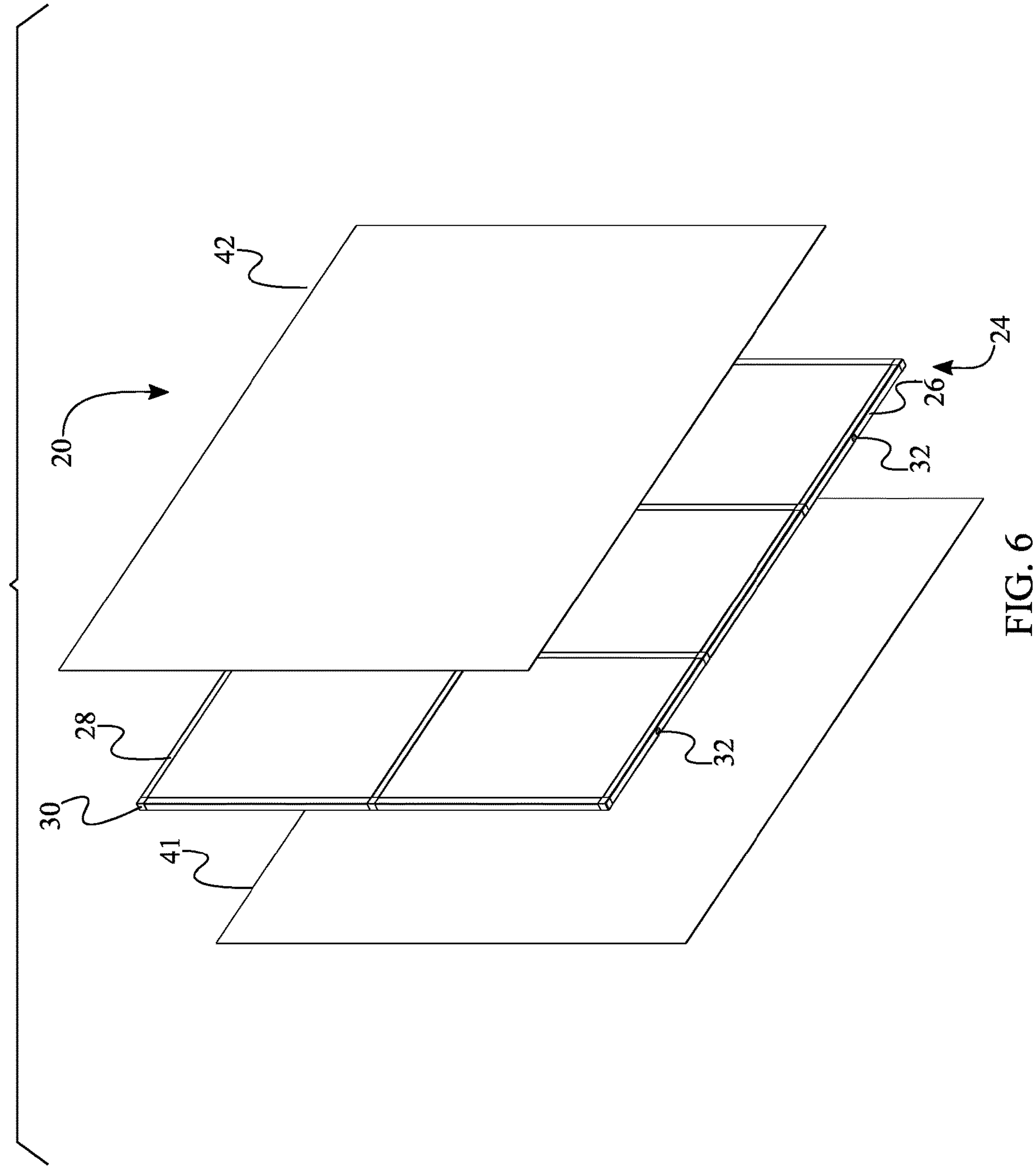
FIG. 6 is a rear-bottom exploded view of at least one background assembly of the present invention.

In order for the support panel 24 to smoothly traverse across the ground, the at least one background assembly 20 may each further comprise a wheel system 31, seen in FIG. 2, FIG. 3, and FIG. 6. The wheel system 31 reinforces a smooth transition from an initial position for the support panel 24 to another position for the support panel 24. Moreover, the wheel system 31 relieves the weight of the support panel 24 against the upper roller guide 21. The wheel system 31 is integrated into the lower panel edge 26, thereby positioning the wheel system 31 directly against the ground. In the preferred embodiment of the present invention, the wheel system 31 comprises a plurality of rollerballs 32, seen in FIG. 2 and FIG. 6. The plurality of rollerballs 32 glide across the ground as each of the plurality of rollerballs 32 is rotatable mounted into the lower panel edge 26. The weight of the support panel 24 is evenly upheld by the plurality of rollerballs 32, the plurality of rollerballs 32 is positioned offset from each other along the lower panel edge 26.

In alternate embodiments of the present invention, the wheel system 31 comprises a first castor wheel 33 and a second castor wheel 34, seen in FIG. 3. The support panel 24 comprises a first lateral edge 29 and a second lateral edge 30. In order for the view of the first background sheet 41 and the second background sheet 42 to remain uninhibited by the first castor wheel 33 and the second castor wheel 34, the first castor wheel 33 is mounted onto the first lateral edge 29, and the second castor wheel 34 is mounted onto the second lateral edge 30. More specifically, the first castor wheel 33 and the second castor wheel 34 directly roll across the ground as the first castor wheel 33 and the second castor wheel 34 are positioned adjacent with the lower panel edge 26.

In order to provide a smooth transition for the support panel 24 between the upper main rail 2 and the upper supplementary rail 5 while preserving the structural integrity of the upper main rail 2 and the upper supplementary rail 5, the track system 1 may further comprise an upper annular support 7, an upper main bearing 8, and an upper switch rail 9, seen in FIG. 1, FIG. 2, FIG. 7, and FIG. 8. The upper main rail 2 may comprise a first upper rail segment 3 and a second upper rail segment 4. The upper annular support 7 mounts the first upper rail segment 3 and the second upper rail segment 4 with the ceiling or comparable structure. The upper main bearing 8 rotates the upper switch rail 9 between the first upper rail segment 3, the second upper rail segment 4, and the upper supplementary rail 5. The upper switch rail 9 either connects the first upper rail segment 3 with the second upper rail segment 4 or connects to the upper supplementary rail 5. Moreover, the upper switch rail 9 serves as a temporary position for the support panel 24 while transitioning from the upper main rail 2 to the upper supplementary rail 5 or the upper supplementary rail 5 to the upper main rail 2. The support panel 24 remains positioned along the upper switch rail 9 until the upper switch rail 9 is aligned in between the first upper rail segment 3 and the second upper rail segment 4 or aligned with the upper supplementary rail 5. The support panel 24 is then slid with the upper roller guide 21 into the adjacent rail.

The overall configuration of the aforementioned components, seen in FIG. 1, FIG. 2, FIG. 7, and FIG. 8, allows the upper switch rail 9 to be rotated as needed to direct a selected support panel 24. In order to quickly position the upper switch rail 9 with the upper main rail 2 and the upper supplementary rail 5, the upper annular support 7 is laterally fixed with the first upper rail segment 3, the second upper rail segment 4, and the upper supplementary rail 5, opposite the upper raceway 6. This arrangement also allows the upper annular support 7 to be mounted into the ceiling or comparable structure. The first upper rail segment 3, the second upper rail segment 4, and the upper supplementary rail 5 are positioned about the upper annular support 7, thereby allowing the upper switch rail 9 to freely rotate within the upper annular support 7. In order for the upper main rail 2 to be continuous, the first upper rail segment 3 and the second upper rail segment 4 are positioned collinear and opposite to each other about the upper annular support 7. The upper switch rail 9 remains connected with the track system 1 while rotating within the upper annular support 7 as the upper main bearing 8 is rotatably mounted within the upper annular support 7 and is laterally fixed with the upper switch rail 9. In order for the upper switch rail 9 to provide a continuous path for the upper roller guide 21 between the upper main rail 2 and the upper supplementary rail 5, the upper switch rail 9 is diametrically positioned across the upper main bearing 8. In the preferred embodiment of the present invention, the track system 1 further comprises an upper crank 10. The upper crank 10 provides a maneuverable grip for a user to rotate the upper main bearing 8. Moreover, the upper crank 10 serves as an extension for the user to be able to maneuver the upper main bearing 8 without having to directly contact the upper main bearing 8. Furthermore, the upper crank 10 enhances the safety of the present invention by keeping the fingers of the user away from the upper annular support 7 and the upper main bearing 8. In order for the upper main bearing 8 to move simultaneously with the upper crank 10, the upper crank 10 is torsionally connected to the upper main bearing 8.

Figure 7:
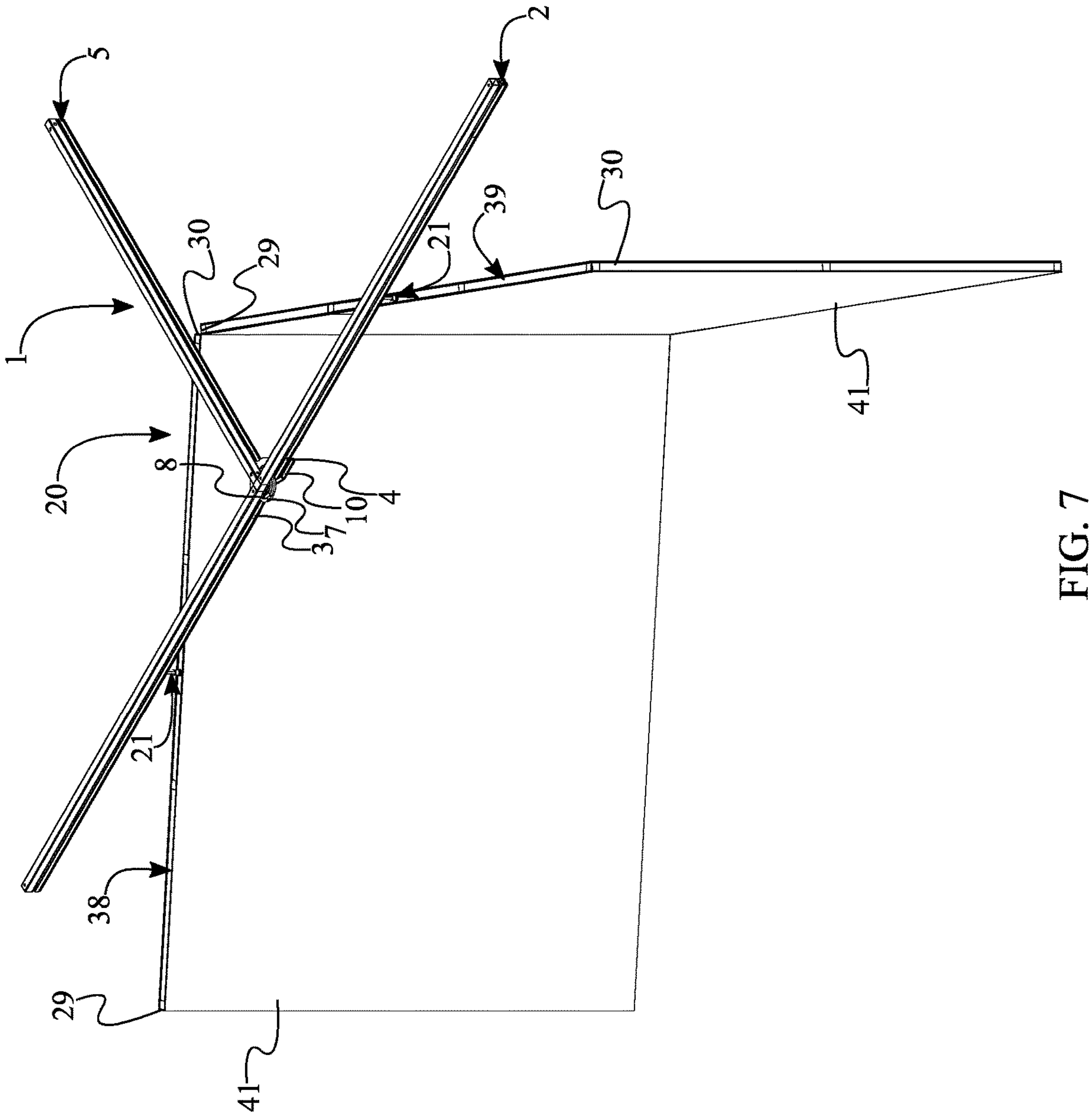
FIG. 7 is a front-top perspective view of a preferred embodiment of the present invention with an arbitrary background assembly and a subsequent background assembly.

In order to define a corner, the at least one background assembly 20 may comprise an arbitrary background assembly 38 and a subsequent background assembly 39, seen in FIG. 7. Moreover, the support panel 24 may comprise a first lateral edge 29 and a second lateral edge 30. The first lateral edge 29 is positioned opposite the second lateral edge 30. Furthermore, the first lateral edge 29 and the second lateral edge 30 are positioned in between the upper panel edge 25 and the lower panel edge 26. While in a storage configuration or in an operational configuration, the second lateral edge 30 of the arbitrary background assembly 38 is positioned adjacent and along the first lateral edge 29 of the subsequent background assembly 39. The at least one background assembly 20 is in the storage configuration while the support panel 24 of the arbitrary background assembly 38 and the support panel 24 of the subsequent background assembly 39 are pressed against each other. Conversely, the at least one background assembly 20 is in the operational configuration while the support panel 24 of the arbitrary background assembly 38 and the support panel 24 of the subsequent background assembly 39 are offset from each other. An angle between the arbitrary background assembly 38 and the subsequent background assembly 39 is defined as desired as the second lateral edge 30 of the arbitrary background assembly 38 is hingedly attached with the first lateral edge 29 of the subsequent background assembly 39.

Figure 8:
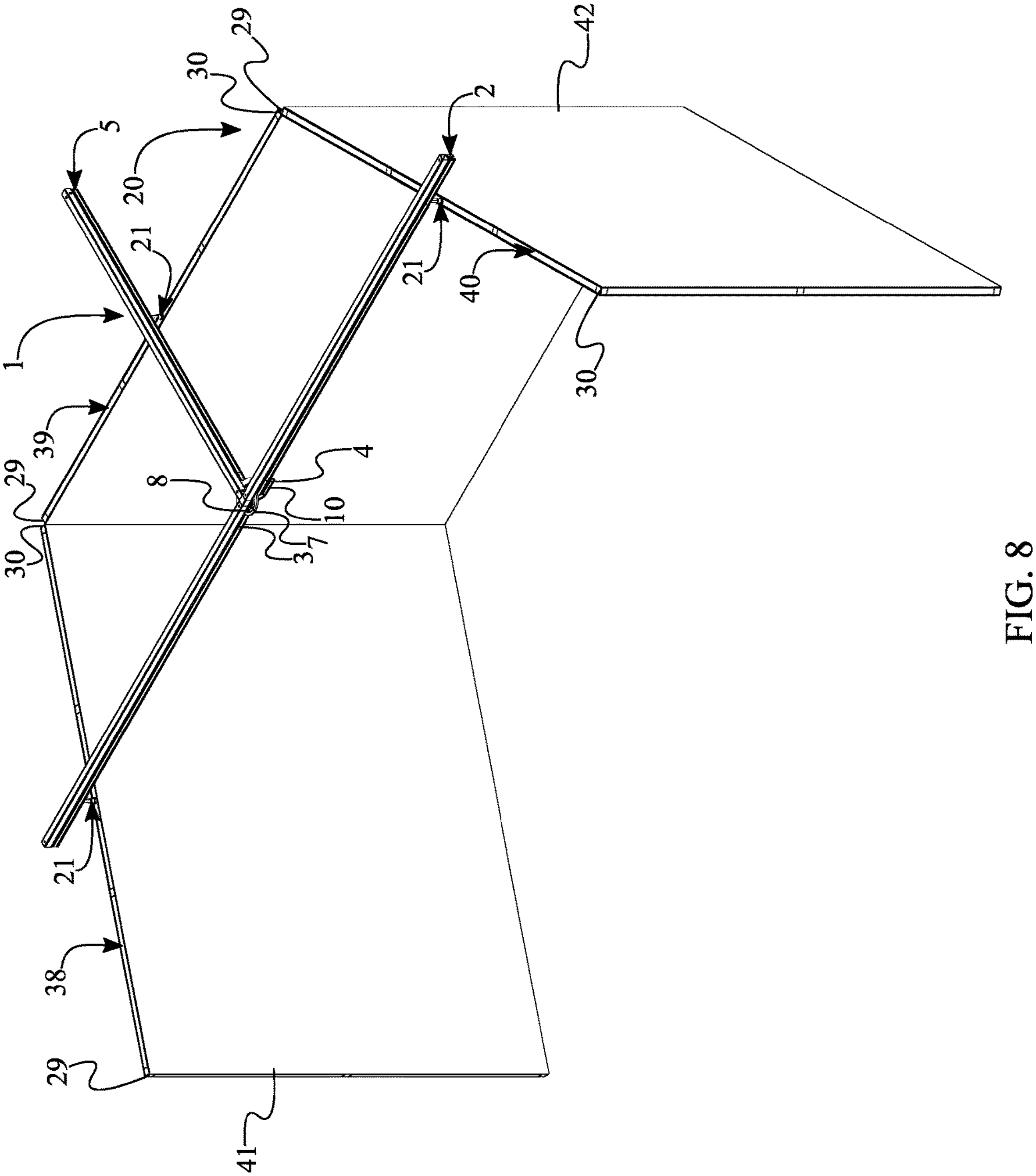
FIG. 8 is a front-top perspective view of a preferred embodiment of the present invention with the arbitrary background assembly, the subsequent background assembly, and a previous background assembly.

In order to define an appearance of a room, the at least one background assembly 20 may further comprise a previous background assembly 40, seen in FIG. 8. While in the storage configuration or in the operational configuration, the second lateral edge 30 of the previous background assembly 40 is positioned adjacent and along the first lateral edge 29 of the arbitrary background assembly 38. In order for a second corner to be defined thereby creating the appearance of a room, the second lateral edge 30 of the previous background assembly 40 is hingedly attached with the first lateral edge 29 of the arbitrary background assembly 38.

Although the invention has been explained in relation to its preferred embodiment, it is to be understood that many other possible modifications and variations can be made without departing from the spirit and scope of the invention as hereinafter claimed.

What is claimed is:

1. A rotatable suspension rail background system with multiple panels comprising:

a track system;

a background assembly;

the track system comprising an upper main rail, an upper supplementary rail, and an upper raceway;

each comprising an upper roller guide, a support panel, a first background sheet, and a second background sheet;

the upper roller guide comprising an upper fixed guide end and an upper free guide end;

the support panel comprising an upper panel edge, a lower panel edge, a first panel face, and a second panel face;

the background assembly being slidably mounted to the track system;

the upper supplementary rail being laterally connected with the upper main rail;

the upper supplementary rail being positioned perpendicular with the upper main rail;

the upper raceway being integrated into and along the upper main rail and the upper supplementary rail;

the upper fixed guide end being positioned opposite the upper free guide end about the upper roller guide;

the upper fixed guide end being movably engaged along the upper raceway;

the upper panel edge being positioned opposite the lower panel edge across the support panel;

the upper panel edge being removably and rotatably attached with the upper free guide end;

the first panel face being positioned opposite the second panel face about the support panel;

the first panel face and the second panel face being positioned in between the upper panel edge and the lower panel edge;

the first background sheet being coextensively fixed across the first panel face; and the second background sheet being coextensively fixed across the second panel face.

2. The rotatable suspension rail background system with multiple panels as claimed in claim 1 comprising:

the background assembly further comprising a first retractable handle and a second retractable handle;

the support panel further comprising a first lateral edge and a second lateral edge;

the first lateral edge being positioned opposite the second lateral edge across the support panel;

the first lateral edge and the second lateral edge being positioned in between the upper panel edge and the lower panel edge;

the first retractable handle being fixed adjacent the first lateral edge; and the second retractable handle being fixed adjacent the second lateral edge.

3. The rotatable suspension rail background system with multiple panels as claimed in claim 1 comprising:

the track system further comprising an upper annular support, an upper main bearing, an upper switch rail, and an upper crank;

the upper main rail comprising a first upper rail segment and a second upper rail segment;

the upper annular support being laterally fixed with the first upper rail segment, the second upper rail segment, and the upper supplementary rail, opposite the upper raceway;

the first upper rail segment, the second upper rail segment, and the upper supplement rail being positioned about the upper annular support;

the first upper rail segment and the second upper rail segment being positioned collinear to each other;

the first upper rail segment and the second upper rail segment being positioned opposite to each other about the upper annular support;

the upper main bearing being rotatably mounted within the upper annular support;

the upper main bearing being laterally fixed with the upper switch rail;

the upper switch rail being diametrically positioned across the upper main bearing; and the upper crank being torsionally connected to the upper main bearing.

4. The rotatable suspension rail background system with multiple panels as claimed in claim 1 comprising:

the background assembly further comprising a wheel system; and the wheel system being integrated into the lower panel edge.

5. The rotatable suspension rail background system with multiple panels as claimed in claim 4 comprising:

the wheel system comprising a plurality of rollerballs;

each of the plurality of rollerballs being rotatably mounted into the lower panel edge; and the plurality of rollerballs being positioned offset from each other along the lower panel edge.

6. The rotatable suspension rail background system with multiple panels as claimed in claim 4 comprising:

the wheel system comprising a first castor wheel and a second castor wheel;

the support panel further comprising a first lateral edge and a second lateral edge;

the first lateral edge being positioned opposite the second lateral edge across the support panel;

the first lateral edge and the second lateral edge being positioned in between the upper panel edge and the lower panel edge;

the first castor wheel being mounted onto the first lateral edge;

the second castor wheel being mounted onto the second lateral edge;

the first castor wheel and the second castor wheel being positioned adjacent with the lower panel edge.

7. A rotatable suspension rail background system with multiple panels comprising:

a track system;

a plurality of background assemblies;

the track system comprising an upper main rail, an upper supplementary rail, and an upper raceway;

each of the plurality of background assemblies comprising an upper roller guide, a support panel, a first background sheet, and a second background sheet;

the upper roller guide comprising an upper fixed guide end and an upper free guide end;

the support panel comprising an upper panel edge, a lower panel edge, a first panel face, and a second panel face;

each of the plurality of background assemblies being slidably mounted to the track system;

the upper supplementary rail being laterally connected with the upper main rail;

the upper supplementary rail being positioned perpendicular with the upper main rail;

the upper raceway being integrated into and along the upper main rail and the upper supplementary rail;

the upper fixed guide end being positioned opposite the upper free guide end about the upper roller guide;

the upper fixed guide end for each of the plurality of background assemblies being movably engaged along the upper raceway;

the upper panel edge being positioned opposite the lower panel edge across the support panel;

the upper panel edge being removably and rotatably attached with the upper free guide end;

the first panel face being positioned opposite the second panel face about the support panel;

the first panel face and the second panel face being positioned in between the upper panel edge and the lower panel edge;

the first background sheet being coextensively fixed across the first panel face; and the second background sheet being coextensively fixed across the second panel face.

8. The rotatable suspension rail background system with multiple panels as claimed in claim 7 comprising:

each of the plurality of background assemblies further comprising a first retractable handle and a second retractable handle;

the support panel further comprising a first lateral edge and a second lateral edge;

the first lateral edge being positioned opposite the second lateral edge across the support panel;

the first lateral edge and the second lateral edge being positioned in between the upper panel edge and the lower panel edge;

the first retractable handle being fixed adjacent the first lateral edge; and the second retractable handle being fixed adjacent the second lateral edge.

9. The rotatable suspension rail background system with multiple panels as claimed in claim 7 comprising:

the track system further comprising an upper annular support, an upper main bearing, and an upper switch rail;

the upper main rail comprising a first upper rail segment and a second upper rail segment;

the upper annular support being laterally fixed with the first upper rail segment, the second upper rail segment, and the upper supplementary rail, opposite the upper raceway;

the first upper rail segment, the second upper rail segment, and the upper supplement rail being positioned about the upper annular support;

the first upper rail segment and the second upper rail segment being positioned collinear to each other;

the first upper rail segment and the second upper rail segment being positioned opposite to each other about the upper annular support;

the upper main bearing being rotatably mounted within the upper annular support;

the upper main bearing being laterally fixed with the upper switch rail; and the upper switch rail being diametrically positioned across the upper main bearing.

10. The rotatable suspension rail background system with multiple panels as claimed in claim 9 comprising:

the track system further comprising an upper crank; and the upper crank being torsionally connected to the upper main bearing.

11. The rotatable suspension rail background system with multiple panels as claimed in claim 7 comprising:

the plurality of background assemblies comprising a first background assembly and a second background assembly;

the support panel further comprising a first lateral edge and a second lateral edge;

the first lateral edge being positioned opposite the second lateral edge across the support panel;

the first lateral edge and the second lateral edge being positioned in between the upper panel edge and the lower panel edge;

the second lateral edge of the first background assembly being positioned adjacent and along the first lateral edge of the second background assembly; and the second lateral edge of the first background assembly being hingedly attached with the first lateral edge of the second background assembly.

12. The rotatable suspension rail background system with multiple panels as claimed in claim 11 comprising:

the plurality of background assemblies further comprising a third background assembly;

the second lateral edge of the third background assembly being positioned adjacent and along the first lateral edge of the first background assembly; and the second lateral edge of the third background assembly being hingedly attached with the first lateral edge of the first background assembly.

13. The rotatable suspension rail background system with multiple panels as claimed in claim 7 comprising:

each of the plurality of background assemblies further comprising a wheel system; and the wheel system being integrated into the lower panel edge.

14. The rotatable suspension rail background system with multiple panels as claimed in claim 13 comprising:

the wheel system comprising a plurality of rollerballs;

each of the plurality of rollerballs being rotatably mounted into the lower panel edge; and the plurality of rollerballs being positioned offset from each other along the lower panel edge.

15. The rotatable suspension rail background system with multiple panels as claimed in claim 13 comprising:

the wheel system comprising a first castor wheel and a second castor wheel;

the support panel further comprising a first lateral edge and a second lateral edge;

the first lateral edge being positioned opposite the second lateral edge across the support panel;

the first lateral edge and the second lateral edge being positioned in between the upper panel edge and the lower panel edge;

the first castor wheel being mounted onto the first lateral edge;

the second castor wheel being mounted onto the second lateral edge;

the first castor wheel and the second castor wheel being positioned adjacent with the lower panel edge.

* * * * *